United States Patent [19]

Padget

[11] 4,172,104

[45] Oct. 23, 1979

[54] RECOVERING CHLORINATED POLYMERS FROM SOLUTION

[75] Inventor: John C. Padget, Runcorn, England

[73] Assignee: Imperial Chemical Industries Limited, London, England

[21] Appl. No.: 896,596

[22] Filed: Apr. 14, 1978

[30] Foreign Application Priority Data

Nov. 28, 1977 [GB] United Kingdom ............... 49344/77

[51] Int. Cl.² .............................................. C07F 6/10
[52] U.S. Cl. .................................................. 528/494
[58] Field of Search ............ 528/494; 260/816, 897 A

[56] References Cited

U.S. PATENT DOCUMENTS

| | | | |
|---|---|---|---|
| 2,958,684 | 11/1960 | Kelley et al. | 528/494 |
| 3,005,812 | 10/1961 | Wohlers | 528/494 |

*Primary Examiner*—Stanford M. Levin
*Attorney, Agent, or Firm*—Cushman, Darby & Cushman

[57] ABSTRACT

In a process for recovery of a chlorinated polymer from solution in a chlorinated hydrocarbon solvent by treatment with steam or hot water the retention of residual solvent in the product is reduced by carrying out the treatment in the presence in the solution of an ethoxylate of a primary aliphatic alcohol having at least 8 carbon atoms.

9 Claims, No Drawings

RECOVERING CHLORINATED POLYMERS FROM SOLUTION

This invention relates to the recovery of chlorinated polymers from solution.

The term "polymer" as used herein includes copolymers.

A process commonly employed for the chlorination of aliphatic polymers (for example natural rubber, polybutadiene polyisoprene, polyethylene, polypropylene and ethylene/propylene copolymers) comprises introducing gaseous chlorine into a solution of the polymer in a chlorine-resistant organic solvent at an elevated temperature (for example at a temperature in the range 60° C. to 120° C.).

The solvents commonly employed in this process are chlorinated hydrocarbons and include not only those solvents which are inert towards chlorine but also others which may react to some degree with chlorine under the conditions employed but, in so reacting, are converted to chlorinated solvents which are substantially inert towards chlorine. Examples include carbon tetrachloride, chloroform, methylene chloride, trichloroethylene, tetrachloroethane and mixtures thereof.

The chlorinated polymer produced may conveniently be isolated in solid form by treatment of the reaction mixture with steam or hot water, thereby distilling off most of the organic solvent employed in the chlorination reaction.

The solid chlorinated polymers thus obtained may be dried by conventional means but, even after the drying stage, often retain an appreciable proportion of the organic solvent in the product (for example up to 10 parts by weight of organic solvent per hundred parts by weight of the chlorinated polymers). The residual organic solvent is difficult to remove by further drying or direct distillation, but vapours of the organic solvent retained in the product may in some circumstances be evolved during subsequent use of the chlorinated polymer, for example during the formulation or use of a paint containing the chlorinated polymer. Such evolution of the organic solvent is generally undesirable, in view of the toxicity of the solvents commonly employed in the chlorination process.

In the specification of U.S. Pat. No. 4,122,249 there is described a process for the preparation of a chlorinated polymer product wherein a solution of a chlorinated aliphatic polymer in a chlorinated hydrocarbon solvent is treated with steam or hot water, thereby separating a chlorinated polymer product in solid form, the treatment with steam or hot water being carried out in the presence in the said solution of a minor proportion by weight (based on the weight of chlorinated polymer) of, interalia, certain aliphatic alcohols compatible with the chlorinated polymer product in the proportions employed.

The said process leads to a solid chlorinated polymer product having a lower proportion of residual solvent than the corresponding product which would be obtained in the absence of the added alcohol.

Among the preferred additives described in the said specification are aliphatic alcohols having at least 8 carbon atoms (preferably at least 12 carbon atoms).

We have now found that especially advantageous results may be obtained by the use of alcohol ethoxylates instead of the alcohols as such. The improved results are partly due to the greater compatibility of the ethoxylates, which makes it possible to use a relatively high concentration of the additive and thereby secure a greater reduction in the level of residual solvent. As when the alcohols as such are used as additives, the product obtained at the precipitation stage is readily handled in that it has little tendency to adhere to the walls of the precipitation vessel.

Thus according to the present invention there is provided a process for the recovery from solution of a chlorinated polymer product wherein a solution of a chlorinated aliphatic polymer in a chlorinated hydrocarbon solvent is treated with steam or hot water, thereby separating a chlorinated polymer product in solid form, the treatment with steam or hot water being carried out in the presence in the said solution of a minor proportion by weight (based on the weight of chlorinated polymer) of an ethoxylate of a primary aliphatic alcohol having at least 8 carbon atoms, the said ethoxylate being compatible with the chlorinated polymer product in the proportions employed.

The solution treated will usually be the product of the chlorination of one or more aliphatic polymers in the chlorinated hydrocarbon solvent.

The ethoxylate may be added prior to the treatment with steam or hot water.

The polymers which may be used as starting materials in the chlorination process include those aliphatic hydrocarbon polymers mentioned hereinbefore in relation to the known process, for example natural rubber, polybutadiene, polyisoprene, polyethylene, polypropylene, ethylene-propylene copolymers, and mixtures thereof.

Other polymers which may be used as starting materials in the chlorination process include poly(halohydrocarbons), for example poly(chloroprene) and poly(vinyl chloride) and partially chlorinated aliphatic polymers.

The term "aliphatic polymer", as used herein, denotes a polymer containing units derived from one or more aliphatic monomers. The term includes polymers which also contain units derived from an aromatic compound, for example (i) the polymers or copolymers of butadiene and isoprene containing toluene in condensed form as described in the specification of United Kingdom Pat. No. 1,082,478 and (ii) telomers derived from a conjugated diene or vinylidene-substituted aromatic compound as taxogen and from an aromatic compound (for example toluene) as telogen, as described in the specification of United Kingdom Pat. No. 1,288,057.

Suitable chlorine-resistant organic solvents, suitable conditions and techniques for the chlorination, and suitable techniques for separating the solid chlorinated polymers by precipitation with steam or hot water may be any of those known in the art.

The ethoxylate preferably contains at least 2 moles of ethylene oxide units per mole of alcohol, for example from 2 to 20 moles of ethylene oxide units per mole of alcohol.

The alcohol from which the ethoxylate is derived preferably contains at least 12 carbon atoms, for example from 12 to 16 carbon atoms. Suitable ethoxylates include the detergent alcohol ethoxylates available from Imperial Chemical Industries Limited under the Trade Mark "Synperonic"; these ethoxylates are derived from a mixture of 67% $C_{13}$ and 33% $C_{15}$ alcohols.

The proportion of the added ethoxylate is preferably at least 1 part (for example from 5 to 20 parts) by weight per hundred parts by weight of the chlorinated polymer. The upper limit may be set in practice by such factors as the compatibility with the chlorinated polymer and the proportion of added ethoxylate which is acceptable for the particular formulation or commercial application in which the solid chlorinated polymer product is to be used.

The invention is illustrated by the following Examples in which all parts and percentages are by weight unless otherwise stated.

EXAMPLE 1

A solution was prepared of 89.5 grams of degraded cis 1,4-polyisoprene in 1000 grams of carbon tetrachloride. Gaseous chlorine was passed into this solution at 68° C. until the chlorine content of the polymer was 66% by weight. Excess chlorine was removed from the solution by purging with nitrogen.

A portion of this solution containing 100 grams of chlorinated polymer in 380 grams of carbon tetrachlorine was taken and 5 grams of the detergent-alcohol ethoxylate "Synperonic" A2 were added, followed by stirring at 68° C. for 1 hour to effect dissolution of the ethoxylate.

The chlorinated polymer was then precipitated by injection of the solution into hot water (95° C.), and the precipitated chlorinated polymer was dried at 85° C. for 24 hours in an oven providing a through flow of air. The carbon tetrachloride content of the dried chlorinated polymer was less than 0.1% by weight. The ethoxylate was compatible with the chlorinated polymer at room temperature.

EXAMPLE 2

The procedure described in Example 1 was repeated, except that the amount of "Synperonic" A2 added was 10 grams. The carbon tetrachloride content of the dried chlorinated polymer was again less than 0.1% by weight. Again the ethoxylate was compatible with the chlorinated polymer at room temperature.

EXAMPLES 3 TO 7

The procedure described in Example 1 was repeated except that different ethoxylates were used in place of "Synperonic" A2. In each case 5 grams of the ethoxylate was added; in each case the ethoxylate was compatible with the chlorinated polymer at room temperature.

The carbon tetrachloride content of the dried chlorinated polymer was as follows:-

| Example | ethoxylate added | carbon tetrachloride content % by weight |
|---|---|---|
| 3 | "Synperonic" A3 | less than 0.1 |
| 4 | "Synperonic" A4 | less than 0.1 |
| 5 | "Synperonic" A7 | less than 0.1 |
| 6 | "Synperonic" A11 | 0.1 |
| 7 | "Synperonic" A20 | 0.1 |

What is claimed is:

1. In a process for the recovery of a chlorinated polymer from a solution thereof in a chlorinated hydrocarbon solvent wherein the solution is treated with steam or hot water to thereby separate out a chlorinated polymer in solid form, the improvement which comprises dissolving in said solution of chlorinated polymer in chlorinated hydrocarbon solvent, before the treatment with steam or hot water, a minor proportion by weight, based on the weight of chlorinated polymer, of an ethoxylate of a primary aliphatic alcohol having at least 8 carbon atoms, said ethoxylate containing at least 2 moles of ethylene oxide units per mole of alcohol, and being compatible with the chlorinated polymer product in the proportions employed, and thereafter treating the resulting solution with steam or hot water thereby obtaining separation of the chlorinated polymer in solid form with a substantially reduced level of residual solvent.

2. A process according to claim 1 wherein the solution treated is the product of chlorination of one or more aliphatic polymers in a chlorinated hydrocarbon solvent.

3. A process according to claim 1 wherein the ethoxylate contains from 2 to 20 moles of ethylene oxide units per mole of alcohol.

4. A process according to claim 1 wherein the ethoxylate is derived from an alcohol containing at least 12 carbon atoms.

5. A process according to claim 4 wherein the ethoxylate is derived from an alcohol containing from 12 to 16 carbon atoms.

6. A process according to claim 1 wherein the proportion of the added ethoxylate is at least 1 part by weight per hundred parts by weight of the chlorinated polymer.

7. A process according to claim 6 wherein the proportion of the added ethoxylate is from 5 to 20 parts by weight per hundred parts by weight of the chlorinated polymer.

8. A process according to claim 1 wherein the chlorinated polymer is a product of chlorination of natural rubber, polybutadiene, polyisoprene, polypropylene, polyethylene or an ethylene/propylene copolymer.

9. A process according to claim 1 wherein the chlorinated hydrocarbon solvent is carbon tetrachloride.

* * * * *